March 9, 1926.                                                 1,575,663
F. C. VANDE WATER ET AL
APPARATUS FOR TREATING OIL
Filed Jan. 16, 1923
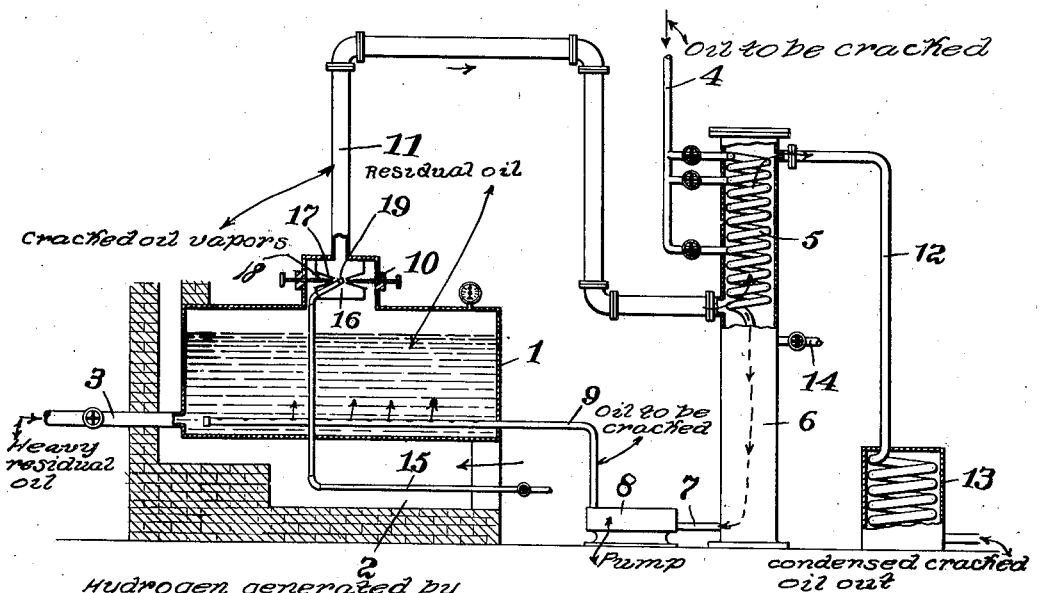
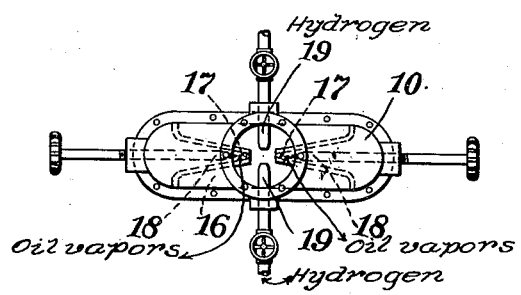
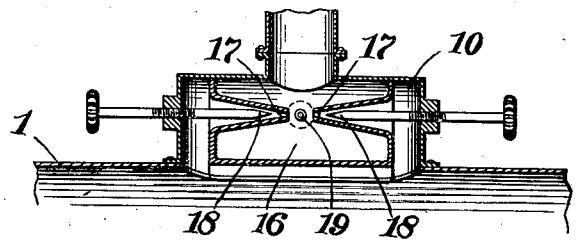
Inventors:
Frank C. Vande Water,
Frederick R. Sunderman,
by Spear, Middleton, Donaldson & Hall
Attys.

Patented Mar. 9, 1926.

1,575,663

UNITED STATES PATENT OFFICE.

FRANK C. VANDE WATER AND FREDERICK R. SUNDERMAN, OF NEWBURGH, NEW YORK, ASSIGNORS TO PETROLEUM LABORATORIES INC., OF NEWBURGH, NEW YORK, A CORPORATION OF NEW YORK.

APPARATUS FOR TREATING OIL.

Application filed January 16, 1923. Serial No. 613,011.

*To all whom it may concern:*

Be it known that we, FRANK C. VANDE WATER and FREDERICK R. SUNDERMAN, citizens of the United States, and residents of Newburgh, in the county of Orange and State of New York, have invented certain new and useful Improvements in Apparatus for Treating Oil, of which the following is a specification.

Our present invention relates to an improvement in the decomposing of petroleum oil whereby the molecule of oil is cracked and hydrogen is introduced resulting in the production of lighter hydrocarbons.

The invention relates to a novel and efficient method of introducing the hydrogen at a point where the decomposed hydrocarbon molecules may take on the same, and under the proper conditions.

The invention consists in introducing the hydrogen in an approximately nascent state. The hydrogen is introduced into the hydrocarbon vapors under high velocity thus causing intimate contact and impact of the hydrocarbon and the hydrogen molecules.

The invention is applicable to any ordinary still used for the purpose of cracking oils, and it will be found that the addition of this invention to the ordinary methods will increase production of lighter hydrocarbons above the amount produced in the ordinary still.

We have illustrated a diagrammatic outlay of a plant, but it is understood that the various parts of the apparatus may be changed as desired.

In these drawings:—

Figure 1 is a diagrammatic view of the still, rectifier and condenser, showing the point of introduction of the hydrogen.

Fig. 2 is a detail of a satisfactory form of apparatus used in the introduction of the hydrogen to the decomposing chamber.

Fig. 3 is a plan view of the device of Fig. 2.

Referring now more particularly to the drawings, 1 illustrates a still of any suitable size or form heated by a furnace 2 of the usual construction, adapted to heat it. This still is provided with a supply pipe 3 for heavy or refuse oils, through which the hydrocarbon to be decomposed passes being heated in its passage therethrough. The refuse or heavy oil mentioned above, should be of a quantity and quality in order to maintain a temperature in the still of not less than five hundred degrees F., upon heating. A pressure between thirty and seventy-five pounds in the still is desirable. The hydrocarbon to be treated is supplied under pressure in any suitable manner through pipe 4 to a coil 5 which is contained within the rectifier 6. From this point the hydrocarbon passes through pipe 7, and by means of the pump 8, through the pipe 9 to the bottom of the still. The pipe 9 inside the still is preferably perforated in order to increase the surface of the hydrocarbon acted upon. The hydrocarbon to be cracked under action of the heat of the heavy oil into which it flows, and the pressure maintained in the still, is transformed into vapor and a portion of the hydrocarbon to be cracked is decomposed. In the decomposition step, the molecule is split, and while in this state its carbon has a strong affinity for hydrogen. Hydrogen is introduced into the dome 10 by means of an iron coil or pipe 15 passing through the fire box, through which steam is made to pass with the result that a reaction occurs in the coil or tube 15 and hydrogen is produced. The hydrogen enters the dome 10 under high velocity. As a result of this action the broken-down molecule of hydrocarbon satisfies its free bonds by taking on hydrogen.

From the dome 10 the cracked vapor passes to the pipe 11 and from thence to the rectifier 6, where the heavy vapors are condensed by reason of the cool hydrocarbon entering through the coil 5, the lighter uncondensed vapors passing through the pipe line 12 to the condenser 13 from which the condensate may pass to a suitable fractionating apparatus. An outlet 14 on the rectifier will allow the heavier hydrocarbon condensed therein to be removed and which condensate can be re-introduced through supply pipe 4 into the system if desirable.

Referring to Fig. 2, we have illustrated a satisfactory combination of elements for the intermingling of the hydrocarbon vapors and the hydrogen, which consists of a supplemental chamber 16 within the dome 10, which is provided with valve seats 17 through which the flow of hydrocarbon vapor is controlled as by valves 18. Arranged at right angles to the point of exit of the cracked hydrocarbon vapor, we provide hydrogen nozzles 19 so that a stream of cracked hydrocarbon vapor and a stream of hydrogen under high velocity, impinge at one point with great force and impact, which produces the desired result. Any excess hydrogen passes over with the cracked hydrocarbon vapor and may be recovered beyond the condenser, if found desirable.

What we claim is:—

A device of the character described, including a still body having a dome, a supplemental chamber within the dome having a series of diametrically opposed valved openings therein, one set of opposed openings being connected to a gas supply, the other set of openings communicating with the still body.

In testimony whereof, we affix our signatures.

FRANK C. VANDE WATER.
FREDERICK R. SUNDERMAN.